United States Patent
Zhang et al.

(10) Patent No.: US 12,061,913 B2
(45) Date of Patent: Aug. 13, 2024

(54) MEMORY, MEMORY CONTROLLING METHOD AND SYSTEM

(71) Applicant: GIGADEVICE SEMICONDUCTOR (XIAN) INC., Xi'an (CN)

(72) Inventors: Junjing Zhang, Xi'an (CN); Huachun Zhang, Xi'an (CN); Ruijie Bai, Xi'an (CN)

(73) Assignee: GIGADEVICE SEMICONDUCTOR (XIAN) INC., Xi'an (CN)

( * ) Notice: Subject to any disclaimer, the term of this patent is extended or adjusted under 35 U.S.C. 154(b) by 0 days.

(21) Appl. No.: 18/202,889

(22) Filed: May 27, 2023

(65) Prior Publication Data

US 2023/0297391 A1   Sep. 21, 2023

Related U.S. Application Data

(63) Continuation of application No. 17/703,228, filed on Mar. 24, 2022, now Pat. No. 11,698,793.

(30) Foreign Application Priority Data

Sep. 14, 2021 (CN) .......................... 202111075729.1

(51) Int. Cl.
G06F 1/32 (2019.01)
G06F 1/3287 (2019.01)
G06F 9/4401 (2018.01)

(52) U.S. Cl.
CPC .......... *G06F 9/4418* (2013.01); *G06F 1/3287* (2013.01)

(58) Field of Classification Search
CPC ...................................................... G06F 1/3287
See application file for complete search history.

(56) References Cited

U.S. PATENT DOCUMENTS

| | | | | |
|---|---|---|---|---|
| 2010/0142305 A1* | 6/2010 | Lee | ........................... | G11C 8/06 365/191 |
| 2014/0032956 A1* | 1/2014 | De Caro | ................ | G11C 5/147 713/324 |

* cited by examiner

*Primary Examiner* — Stefan Stoynov
(74) *Attorney, Agent, or Firm* — IPro, PLLC

(57) ABSTRACT

A memory, a method controlling method and a system are disclosed. The memory includes: an array of memory cells; an instruction decoder; a controller; and an I/O interface, including a chip select pin. The operational states of the memory include a deep power-down state, and in the deep power-down state, they are all disabled. In response to receiving a chip select signal, the memory enters a higher power state from the deep power-down state. The memory of the present disclosure provides the deep power-down state that disables the decoder, and the memory in the deep power-down state exits directly to a higher power state to achieve some functions without enabling all components, thereby reducing power consumption.

20 Claims, 3 Drawing Sheets

MEMORY, MEMORY CONTROLLING METHOD AND SYSTEM

CROSS-REFERENCE TO RELATED APPLICATIONS

This application claims priority to a Chinese patent application No. 202111075729.1 filed on Sep. 14, 2021, the disclosure of which is incorporated herein by reference in its entirety.

TECHNICAL FIELD

The disclosure herein relates to the field of memory, and in particular, to a memory, a memory controlling method and a system.

BACKGROUND

Flash memory (Flash), with its characteristics of high storage density, high reliability, and low power consumption, is more and more widely used today. Flash memory includes NAND Flash and NOR Flash. NOR Flash, also known as code-type memory, is usually used with microcontrollers, supports in-chip execution (XIP, eXecute In Place), and has a wide range of applications in automotive electronics, wearable devices, smart home appliances, and home medical equipment. With the improvement of device performance and integration, as well as the characteristics of distributed applications, battery replacement or frequent charging will bring many inconveniences. Therefore, how to extend battery life and reduce device power consumption is an important challenge for flash memory applications.

SUMMARY

According to a first aspect of the present disclosure, there is provided a memory comprising: a memory cell array; an instruction decoder; a controller; and an input and output interface including a chip select pin; wherein, the operational states of the memory include a deep power-down state, and in deep power-down state, the memory cell array, the instruction decoder and the controller are disabled; in response to the chip select pin receiving a chip select signal, the memory enters a higher power state in which the instruction decoder is enabled from the deep power-down state; and in response to the instruction decoder receiving a deep power-down state instruction, the memory enters the deep power-down state from a higher power state.

Optionally, the input and output interface further includes a clock interface, a data input interface, and a data output interface, the memory further comprising a clock buffer, a data input buffer, a data output buffer, and a chip select signal buffer, in the deep power-down state, the clock buffer, the data input buffer, and the data output buffer are disabled and the chip select signal buffer is enabled.

Optionally, in a higher power state, the clock buffer, the input buffer, the data output buffer, and chip select signal buffer are all enabled.

Optionally, the operational states of the memory include a standby state and a power-down state as a higher power state, and in standby state, the memory cell array, the instruction decoder and the controller are enabled.

Optionally, the memory in the power-down state enters the standby state in response to a reset instruction.

Optionally, when executing READ ID instruction in the power-down state, in case that the reset instruction is received, the memory waits for the execution of the READ ID instruction to complete before executing the instruction to leave the power-down state.

Optionally, the memory in the power-down state enters the standby state in response to an instruction to leave the power-down state, and when executing READ ID instruction in the power-down state, in case that the instruction to leave the power-down state is received, the memory enters the standby state without waiting for the execution of the READ ID instruction to complete.

Optionally, the memory further comprises: an ID register, wherein the ID register is enabled in the standby state, the power-down state, and the deep power-down state.

Optionally, in the power-down state, the memory sends information in the ID register to a host in response to a READ ID instruction from the host.

Optionally, in the power-down state, internal clock is disabled, and the execution of the READ ID instruction is under the control of external clock CLK received from the input and output interface.

According to a second aspect of the present disclosure, there is provided a memory controlling method, the memory includes a memory cell array, an instruction decoder, a controller and a chip selection pin, the operational states of the memory include a deep power-down state, the method comprising: in response to the chip select pin receiving a chip select signal, the memory entering a higher power state from a deep power-down state; in response to the instruction decoder receiving a deep power-down state instruction, the memory entering the deep power-down state from a higher power state, wherein, in the deep power-down state, the memory cell array, the instruction decoder and controller are disabled; in a higher power state, the instruction decoder is enabled.

According to a third aspect of the present disclosure, there is provided a system comprising: a host; an interface bus; the memory of the first aspect of the present disclosure, coupled to the host by connecting of the input and output interface to the interface bus.

Therefore, the memory of the present disclosure provides the deep power-down state that disables the decoder, and the memory in the deep power-down state exits directly to a higher power state to achieve some functions without enabling all components, thereby reducing power consumption.

BRIEF DESCRIPTION OF FIGURES

The above and other objects, features and advantages of the present disclosure will become more apparent from the more detailed description of the exemplary embodiments of the present disclosure taken in conjunction with the accompanying drawings, wherein the same reference numerals generally refer to the same parts in the exemplary embodiments of the present disclosure.

DETAILED DESCRIPTION

Figure 1:
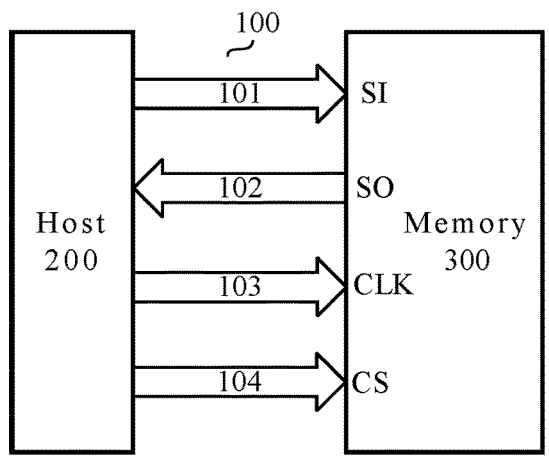
FIG. 1 illustrates a simplified schematic diagram of a system including a memory according to one embodiment of the present disclosure.

Preferred embodiments of the present disclosure will be described in more detail below with reference to the accompanying drawings. While preferred embodiments of the present disclosure are shown in the drawings, it should be understood that the present disclosure may be embodied in various forms and should not be limited by the embodiments set forth herein. Rather, these embodiments are provided so that this disclosure will be thorough and complete, and will fully convey the scope of the disclosure to those skilled in the art.

Various embodiments will be described in more detail with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the disclosure to those skilled in the art. In the present disclosure, the same reference numerals refer to the same parts throughout the various figures and embodiments of the present disclosure.

Note that the drawings are simplified schematic diagrams and therefore not necessarily drawn to scale. In some instances, parts of the figures may have been exaggerated in order to more clearly illustrate certain features of the illustrated embodiments.

It is further noted that in the following description, specific details are set forth in order to facilitate an understanding of the present disclosure, however, the present disclosure may be practiced without some of these specific details. Additionally, it is noted that well-known structures and/or procedures may only be described briefly or not at all in order to avoid obscuring the disclosure with unnecessary detail.

It should also be noted that, in some cases, unless otherwise specified, elements (also referred to as features) related to one described embodiment may be used alone or in combination with other elements of another embodiment as would be apparent to those skilled in the relevant art.

Various embodiments of the present disclosure will be described in detail below with reference to the accompanying drawings, and for ease of understanding, an application environment of the present disclosure will be described first with reference to FIG. 1.

FIG. 1 illustrates a simplified schematic diagram of a system including a non-volatile memory according to one embodiment of the present disclosure. The system 10 may be implemented as an electronic device, and the device 10 may include a host 200 and a memory 300 as shown, and both communicate via a bus 100.

Here, the host 200 refers to a part that implements the key functions of the device 10, that is, the main part of the device 10, and the host 200 (or the device 10) may be any appropriate electronic device. In one embodiment, device 10 may be an electronic device including, but not limited to, for example, portable electronic devices such as mobile phones, tablet computers, wearable devices (e.g., TWS headsets) and laptop computers or portable electronic devices such as desktop computers, game consoles, non-portable electronics such as televisions, set-top boxes, and projectors, and even industrial IoT devices such as individually set-up sensors. In this case, the memory 300 may be a device that provides storage services for an independent electronic device.

In other embodiments, the device 10 may also be electronic devices with relatively independent functions (these electronic devices are usually key components constituting electronic equipment), such as independently sold smart screens, main control chips, camera components, and the like. These electronic devices often need to be assembled, for example, a smart screen to a mobile phone, to serve consumers (e.g., users who buy a mobile phone). In this case, the memory 300 may be a component that provides necessary storage services for electronic components.

Here, the host 200 may be implemented as or include a microcontroller, a microprocessor, an application specific integrated circuit (ASIC), or an application specific standard product (ASSP), and is coupled to the memory 300 (as a slave device) via the bus 100 as shown. Here, the bus 100 can be implemented as a serial peripheral interface (SPI) bus, for example, and includes a plurality of connection lines 101-104 as shown in the figure to realize the transmission of instructions, addresses and data, to read the code stored in the memory 300 and execute the code; erase and write the code when needed, such as for firmware over-the-air upgrades.

In the illustrated example, the bus 100 may include at least a data input line 101, a data output line 102, a clock line 103 and a chip select line 104. Among these lines, the data input line 101 carry data signals generated by the host 200 and received by the memory 300, which data may include commands and address sequences and the like. Signals generated by memory 300 and received by host 200, e.g., data read from memory 300 (e.g., code executable on host 200), are transmitted on the data output line 102. The clock line 103 is used to send the clock signal generated by the host 200 into the memory 300, thereby realizing synchronous transmission of data between the two parties. When data transmission is required between the host 200 and the memory 300, the chip select signal on the chip select line 104 is set to an active level, e.g., a low level. After the data transmission is completed, the chip selection signal on the chip selection line 104 is set to an inactive level, e.g., a high level. Although not shown in the figure, it should be understood that the bus 100 may also enable the connection of the host 200 to other slave or peripheral devices, in which case other chip select lines would be provided for these devices.

The host 200 and the memory 300 may each include pins for making connections as above. In a preferred embodiment, the memory 300 may be implemented as a flash memory device, especially NOR flash and NAND flash, with an SPI interface, capable of sequential access to data via a serial interface (pins) and suitable for applications such as voice, image, program code and data storage and many other applications. Specifically, the memory 300 can be enabled by a chip select signal received on a chip select (CS) pin (e.g., a prescribed active "assertion" signal), and data access can be accomplished via a data input (SI) pin, a data output (SO) pin, and a clock (CLK) pin.

The memory circuit 300 may include an input/output (I/O) interface connected to outside, and the input/output interface includes a data input interface, a data output interface, a clock interface, and a chip selection interface. The input/output interface may generally be implemented as pins including a SI pin, a SO pin, a CLK pin and a CS pin, wherein, the SI pin corresponds to the data input interface, the SO pin corresponds to the data output interface, the CLK pin corresponds to the clock interface, and the CS pin corresponds to the chip selection pin/interface. The above pins can use the bus 100 shown in FIG. 1, especially the data input line 101, the data output line 102, the clock line 103 and the chip select line 104 included in the SPI bus to exchange data with the outside, such as with the host, thereby realize data reading, erasing, or writing under the control of the host.

It can be understood that although the SI pin, SO pin, CLK pin and CS pin are collectively referred to as the input and output interface, in actual operation, the SI pin, CLK pin and CS pin can be designated for get external signals; the SO pin can be designated to output data to the outside, such as program codes read from the memory 300, or status signals registered in the internal registers of the memory 300, and the like. Further, the SI pin, the CLK pin and the CS pin are each used to obtain signals of different properties from the outside. Specifically, the instruction sent by the host 200 to the memory 300 may be an operator, the operator includes multiple bits (e.g., 8 bits), and the SI pin obtains the operator sequentially. The instructions fetched by the SI pins usually cannot be directly used for memory control but need to be converted into identifiable control instructions in the memory through decoding by a decoding device (e.g., via the instruction decoder 331 in FIG. 2). The CLK pin is used to receive a clock signal (e.g., a clock pulse of a specific frequency) of the host for synchronous data transmission. For example, on the rising edge of the clock signal, the host 200 sends data and the memory 300 receives data. The CS pin obtains the chip select signal from the host 200. The chip select signal may be a strobe pulse or an active level lasting for a predetermined time (for example, when the chip select signal is at a low level, the memory 300 can receive the clock and data signals from the host 200, when the chip select signal is high, the memory 300 ignores the clock and data signals on the clock line 103 and the data input line 101), and the operation inside the memory can usually be changed directly based on the above chip select signal.

Figure 2:
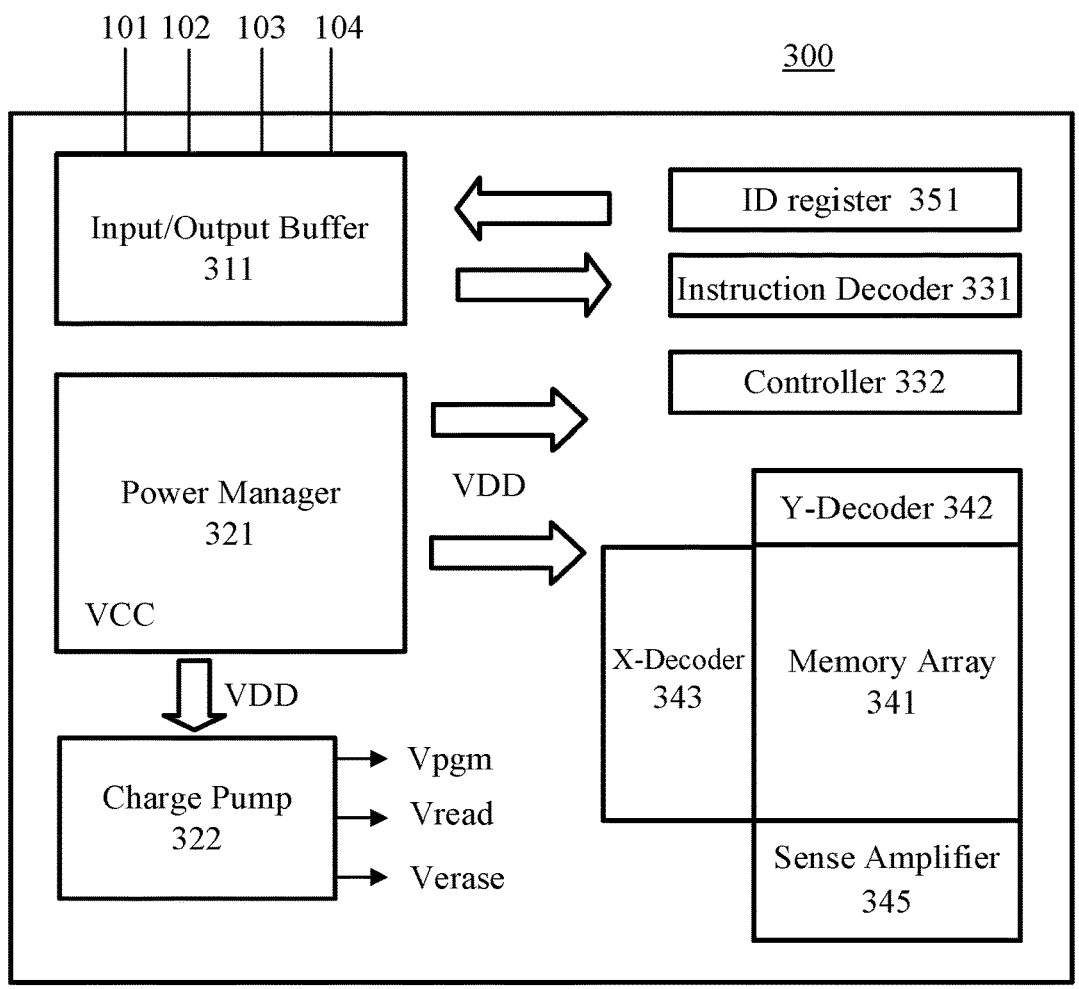
FIG. 2 illustrates a schematic diagram of the composition of a memory according to an embodiment of the present disclosure.

FIG. 2 illustrates a schematic diagram of the composition of a memory according to an embodiment of the present disclosure. The memory 300 also includes an input/output (I/O) buffer 311, a power manager 321, a charge pump 322, an ID register 351, an instruction decoder 331, a controller 332, a memory array 341, a column decoder (Y-decoder) 342, a row decoder (X-decoder) 343, and a sense amplifier 345. The memory array 341 includes a plurality of memory cells arranged in an array and addressable by word lines and bit lines. The memory cells may be transistors with floating gates or insulating layers capable of trapping charges. The X-decoder 343 is used to select the word line according to the address. The Y-decoder 342 is used to select the bit line according to the address. The sense amplifier 345 is used to perform read and verify operations of the memory array 341. The charge pump 322 is used to provide voltage for the operation of the memory array 341. The power manager 321 is used to power the charge pump 322, the instruction decoder 331, the controller 332, the memory array 341, the Y-decoder 342, the X-decoder 343 and the sense amplifier 345. The ID register 351 is used to store information such as the memory ID and the manufacturer ID of the memory. Memory 300 also includes an internal clock for providing clock signals for the operation of memory array 341. Accordingly, the clock signal on the clock line 103 may be referred to as an external clock.

The data acquired from the I/O interface may be temporarily stored in the I/O buffer 311 and further transmitted to the instruction decoder 331 or the controller 332. The data input line 101 and data output line 102 support serial protocols. The data received through the data input line 101 is first stored in the shift register of the I/O buffer 311, and then the data is moved from the shift register to the SRAM, so that it can be provided to the controller 332 in parallel. The instruction received through the data input line 101 is first stored in the shift register of the I/O buffer 311, and then provided to the instruction decoder 331. Here, the controller 332 may refer to a component that controls operations of various components inside the memory 300 and may include a plurality of sub-control components. Although not shown in FIG. 2, the controller 332 may also include control components for operating, for example, access to the memory array 341 and the like.

In some embodiments, the signals obtained from the SI pin, the CLK pin and the CS pin may be buffered in the data input buffer, the clock buffer and the chip select signal buffer in the I/O buffer 311, respectively. Correspondingly, the I/O buffer 311 may further include a data output buffer for buffering the data to be output via the SO pin.

The instruction decoder 331 is used to read the instruction signal received by the SI pin from the data input buffer of the I/O buffer 311 and decode it into an internal instruction that can be executed by the memory. The internal instruction sends a control signal to the power manager 321, and the power manager 321 can supply power to various components inside the memory in response to the control signal.

Although not shown in the figure, the memory 300 may include a power interface for receiving an external power source, such as a pin receiving an external voltage VCC (e.g., a first voltage). For example, the pin may obtain power supply from a power supply device of the system (e.g., the electronic device 10). Further, the memory 300 may further include a pin connected to the system ground. The input and output interface of the memory 300 can usually work directly at the external voltage VCC, while the internal circuits of the memory 300, such as the memory array, usually work at a voltage different from VCC (i.e., the operating voltage VDD of the memory, for example, the second voltage), and VDD is typically lower than VCC, so the power manager 321 is required to provides the operating voltage VDD for the components in the memory. In other embodiments, the external voltage VCC may be the same as the memory operating voltage VDD, in which case the power manager 321 may only be used to power the various components as follows.

The power manager 321 may be used to power various components operating at the VDD voltage. Additionally, the memory may also include the charge pump 322 that provides specific voltages for reading, erasing, and writing of the memory array 341 (e.g., a negative voltage for unselected word lines during a read of NOR flash, etc.). In one embodiment, the charge pump 322 itself needs to operate at VDD, so the power manager 321 is also used to supply voltage to the charge pump 322 when needed. The charge pump 322 may include a plurality of charge pump circuits for generating the read operation voltage Vread, the write operation voltage Vpgm and the erase operation voltage Verase, respectively.

With the further miniaturization of portable devices and wearable devices, and the spread of distributed devices such as IoT applications, memory is expected to further reduce power consumption. Since memory, such as NOR flash, usually stores program codes used by the host to execute, and these program codes are read to the outside, such as the built-in RAM of the host 200 or the independent RAM of the system 10, the memory does not need to be continuously accessed. Thus, the memory can be placed into a power-down state where power to various components in the memory can be disabled, such as stopping power to the memory array, and the data output circuit (not shown), However, the power supply to the components that can respond to the control signal of the host, such as the instruction decoder, is maintained.

Figure 3:
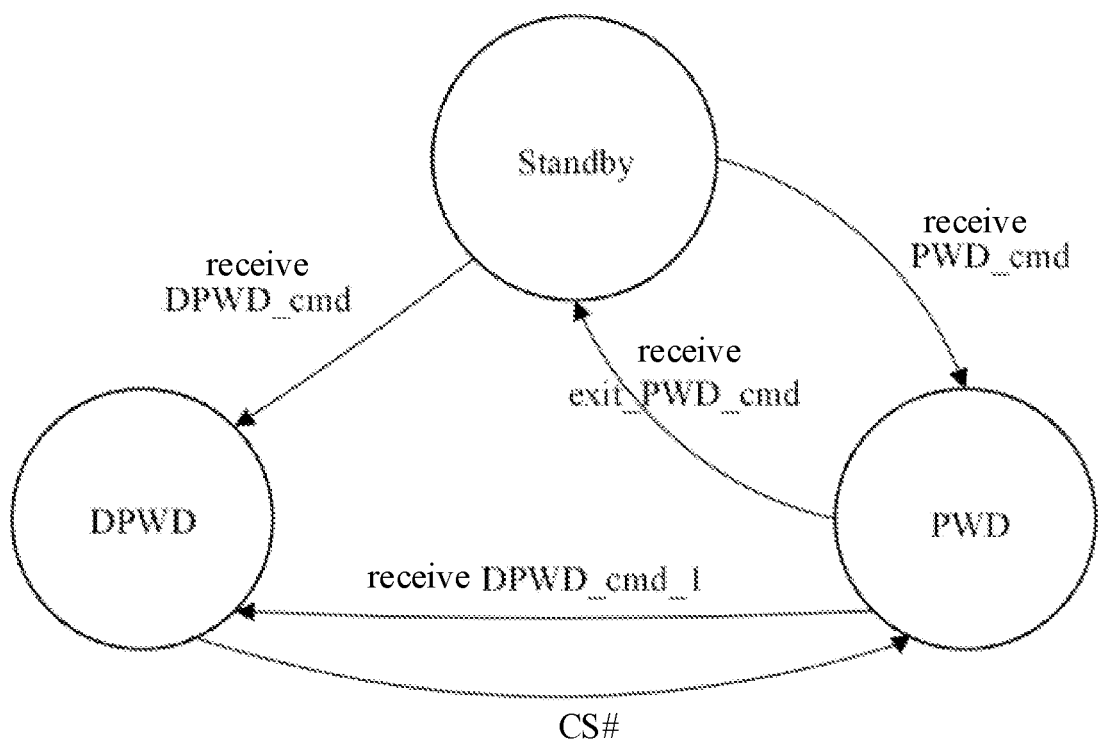
FIG. 3 illustrates a schematic diagram of state transitions of a memory according to an embodiment of the present disclosure.

FIG. 3 illustrates a schematic diagram of state transitions of a memory according to an embodiment of the present disclosure. As shown, the operational states of the memory 300 may include a Standby state, a PoWer-Down state (PWD), and a Deep PoWer-Down state (DPWD).

The following table lists the enabling and disabling of each component in the memory 300 corresponding to various states.

TABLE 1

|  | Standby | PWD | DPWD |
| --- | --- | --- | --- |
| Data input buffer | enabled | enabled | disabled |
| Data output buffer | enabled | enabled | disabled |
| Cs signal buffer | enabled | enabled | enabled |
| Clock buffer | enabled | enabled | disabled |
| ID register | enabled | enabled | enabled |
| Instruction decoder | enabled | enabled | disabled |
| Charge pump | enabled | disabled | disabled |
| Controller | enabled | enabled | disabled |
| X-decoder | enabled | disabled | disabled |
| Y-decoder | enabled | disabled | disabled |
| Sense amplifier | enabled | disabled | disabled |
| Memory array | enabled | disabled | disabled |
| Power manager | enabled | enabled | disabled |
| Internal clock | enabled | disabled | disabled |

"Enabled" means that the component is in a state that allows it to be used. "Disabled" means that the component is in a state that is not allowed to be used. For example, the use of the components is allowed to be enabled by power supply, and the use of the components is disabled by stopping the power supply.

The standby state may indicate a state in which the memory 300 can perform a corresponding operation in response to any instruction of the host 200. In the standby state, if there is no data transfer between the host 200 and the memory 300, the chip selection signal is maintained at an inactive level. The standby state may further include an active state (active). When the host 200 needs to send an instruction or data to the memory 300, the host 200 sets the chip select signal to an active level, the memory 300 enters an active state, and the memory 300 receives the instruction or data through the data input line 101 and sets the busy signal to active. The standby state when the chip selection signal is at an active level can be called an active state. The present disclosure provides two power saving states for the memory: the power-down state (PWD) and the deep power-down state (DPWD). The deep power-down state may refer to a state that retains power only to component(s) required to be able to restore the memory to a higher power state upon chip select signal becoming active. In the deep power-down state, the memory 300 cannot respond to any command sent by the host 200 via the input signal line 101. In the power-down state, the memory 300 can respond to some commands sent by the host 200 via the input signal line 101. Accordingly, some functions of the memory 300 are disabled and accordingly some components are not powered. For example, in the power-down state, the memory 300 cannot receive operational instructions for the memory array, and accordingly, components used to perform operations on the memory array (e.g., high voltage generating components, sense amplifiers, X-decoders, Y-decoders, etc.) are disabled.

As shown in FIG. 3, memory 300 in the deep power-down state exits from the deep power-down state to the power-down state in response to the chip select signal (e.g., the illustrated low level chip select signal CS #). The memory 300 in the standby state enters the deep power-down state in response to the received deep power-down state command (DPWD_cmd) and enters the power-down state in response to the received power-down state command (PWD_cmd). The memory 300 in the power-down state enters the deep power-down state in response to the received deep power-down state command (PWD_cmd_1) and enters the standby state in response to the received power-down state exiting command (exit_PWD_cmd).

Thereby, the memory 300 can directly perform operations permitted by the power-down state in a state with lower power consumption than the standby state (i.e., in the power-down state). After the operation in the power-down state is over, it can be determined whether to enter the deep power-down state or the standby state as required, thereby achieving more effective power saving and more flexible operation.

In some cases, the host 200 determines that the memory 300 does not need to be accessed for a period according to the task to be executed, and the host 200 sends the deep power-down state command (DPWD_cmd) or the power-down state command (PWD_cmd) to the memory 300 in the standby state. For example, the host 200 determines that it is not necessary to read the ID register of the memory 300 or perform operations on the memory array 341 in the next period, so the host 200 sends the deep power-down state command (DPWD_cmd) to the memory 300, and the memory 300 enters the deep power-down state. For another example, the host 200 determines that the ID register of the memory 300 needs to be read in the next period but does not need to operate the memory array 341, so host 200 sends the power-down state command (PWD_cmd) to the memory 300, and the memory 300 enters the power-down state. For another example, the memory 300 is in the power-down state, and the host 200 determines that it is not necessary to perform operations on the memory array 341 of the memory 300 in the next period, so the host 200 sends the deep power-down state command (DPWD_cmd_1) to the memory 300, and the memory 300 enters the deep power-down state for further power savings.

The various states and state transitions involved in the memory of the present disclosure will be described below with reference to FIGS. 2-3 and subsequent state transition timing diagrams.

As shown in FIG. 3, in either the standby state or the power-down state, the memory 300 can directly enter the deep power-down state according to the deep power-down state command. FIG. 3 uses DPWD_cmd and DPWD_cmd_1 to distinguish the instructions for entering the deep power-down state in different states, but in actual operation, the corresponding opcodes of DPWD_cmd and DPWD_cmd_1 may be the same or different. In other words, in the standby state and the power-down state, since it needs to enter the deep power-down state in response to the opcode, in both states, the power manager 321 needs to supply power to the instruction decoder 331 to make the instruction decoder 331 is enabled so that memory 300 can enter the deep power-down state based on the deep power-down state instruction.

Figure 4:
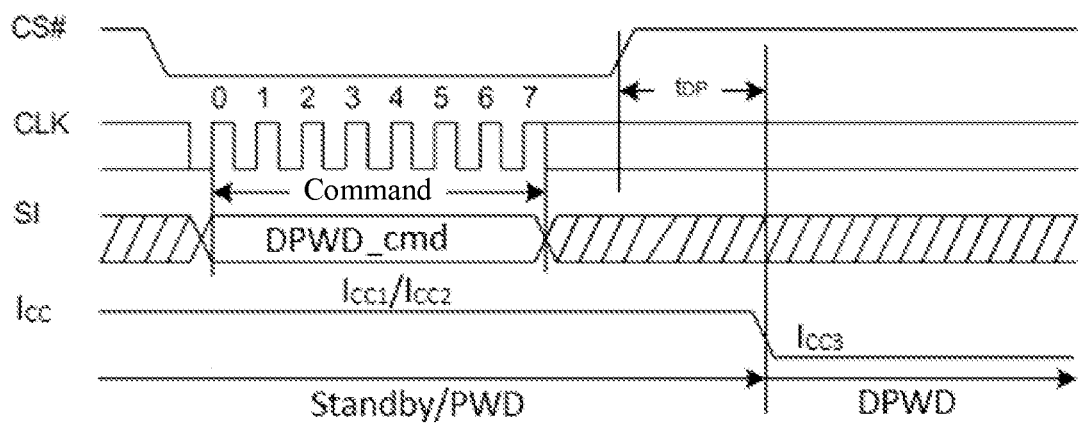
FIG. 4 illustrates a timing diagram for entering a deep power-down state according to one embodiment of the present disclosure.

FIG. 4 illustrates a timing diagram for entering the deep power-down state according to one embodiment of the present disclosure. As shown, the CS pin receives a valid chip select signal CS #, the CLK pin receives the clock signal, and for the next 8 clock cycles, the memory sequentially receives 8 bits from the SI pin opcode. In different embodiments, the opcodes may also have different number of bits. The memory completes the decoding and corresponding control operations within top time, causing the memory to enter the deep power-down state.

As discussed above, the deep power-down state here may refer to a state that retains power only to components required to be able to restore the memory to a higher power state upon chip select signal becoming active. In other words, in the deep power-down state, it is only necessary to retain power to the components that can react to the chip select signal and thereby cause the memory to leave the deep power-down state. To this end, the power manager 321 may stop supplying power to the instruction decoder 331 and the controller 332 in the deep power-down state. Accordingly, the power manager 321 also stops power supply to the memory array 341 and the charge pump 322. This minimizes the current $I_{CC}$ on the VCC pin, i.e., from $I_{CC1}$ or $I_{CC2}$ to $I_{CC3}$. Although shown in the same figure, it should be understood that the current $I_{CC1}$ in the standby state is greater than the current $I_{CC2}$ in the power-down state. More specifically, if the active state is entered from the standby state, the current $I_{CC}$ may become larger, e.g., $I_{CC4}$ corresponding to a read operation, $I_{CC5}$ corresponding to an erase operation, $I_{CC6}$ corresponding to a write operation, and so on. Also, after transitioning to the deep power-down state, any signal on the SI pin is ignored.

When a valid chip select signal is received on the CS pin, such as when an active low signal CS # is received, the memory in the deep power-down state can react to the chip select signal, thereby causing the memory to leave the deep power-down state.

Figure 5:
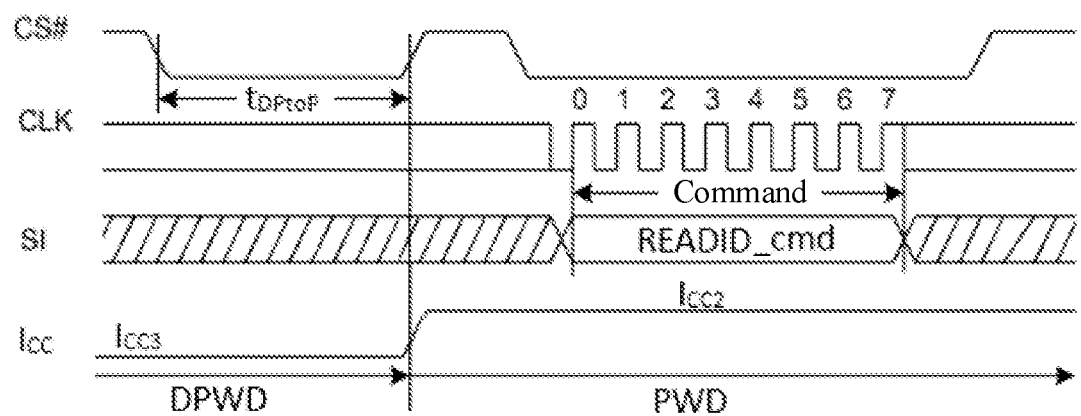
FIG. 5 illustrates a timing diagram for leaving a deep power-down state according to one embodiment of the present disclosure.

FIG. 5 illustrates a timing diagram for leaving the deep power-down state according to one embodiment of the present disclosure. In the example shown in FIG. 5, the memory can only exit from the deep power-down state under the action of the low level chip select signal on the CS pin. At this time, the CLK pin, SI pin and SO pin are still ignored. Power manager 321 is disabled in the deep power-down state. In response to the chip select signal, the power manager 321 is enabled, so the power manager 321 can supply power to specified components, such as the instruction decoder 331, and enter the power-down state.

In one embodiment, the power manager 321 may include a start-up circuit (e.g., a trigger circuit) and a voltage conversion circuit. The start-up circuit may enable the voltage conversion circuit in response to the chip select signal, to realize the power supply for specific components, such as the power supply for the instruction decoder 331. In this embodiment, the I/O buffer 311 can also be disabled, and the chip select signal can bypass the I/O buffer 331 directly and be passed to the start-up circuit.

In other embodiments, the chip select signal buffer and 10 control can remain powered in the deep power-down state. Thus, the chip select signal can be passed to the power manager via the chip select buffer.

Regardless of the manner described above, after the chip select signal remains low for a predetermined time (e.g., $t_{DPtoP}$ as shown), the memory exits the deep power-down state and enters the power-down state. In the power-down state, since components such as the instruction decoder 331 are enabled, the memory current increases from $I_{CC3}$ to $I_{CC2}$.

Additionally, in addition to being able to enter the standby state in response to a power-down state exiting command and enter the deep power-down state in response to an deep power-down command, the memory is also capable of performing at least part of a read command operation, for example, performing a read operation on the contents of one or more registers of the memory in the power-down state. Referring to FIG. 2, the memory 300 may also include the ID register 351 for memory-related ID information. The memory can read the memory ID information (for example, the memory ID, the manufacturer ID of the memory, etc.) from the memory array (for example, the memory area dedicated to memory ID information) when the memory is powered on and store it in the ID Register 351. The ID register 351 may remain enabled throughout the power-up period of the memory 300, thereby ensuring that the registered information is not lost. Therefore, when the memory 300 in the power-down state receives the READ ID (read ID) command as shown in FIG. 5, the command decoder 331 can decode the above command and output the ID information through the SO pin. In this case, to realize the above read ID function, the clock buffer, the data input buffer, the data output buffer, and the chip select buffer in the input and output buffer 311 all need to be enabled. Correspondingly, the I/O control also needs to be enabled to realize the execution of the read ID instruction. In the power-down state, the internal clock is disabled, and the READ ID operation is under the control of the external clock CLK on the clock line 103. In some embodiments, the memory 300 may also exit from the power-down state and enter the standby state based on the RESET command sent by the host 200. If the memory 300 in the power-down state receives the instruction to leave the power-down state when executing the READ ID instruction, the memory 300 will wait for the execution of the READ ID instruction to complete (i.e., send the ID information to the host 200) before executing the instruction to leave the power-down state. If the memory 300 in the power-down state receives the RESET instruction when executing the READ ID instruction, the memory 300 directly executes the RESET instruction without waiting for the completion of the execution of the READ ID instruction. A RESET line is also set between the host 200 and the memory 300, and the RESET command is a low-level signal on the RESET line.

The memory may enter the standby state from the power-down state in response to the instruction decoder receiving a power-down state exiting instruction. Likewise, in response to the instruction decoder receiving a power-down state instruction, the memory may enter the power-down state from the standby state.

Further, the present disclosure can also be implemented as a system, such as the electronic device shown in FIG. 1, including a host, an interface bus, and the memory as described above. The memory is coupled to the host through the connection of its input-output interface (e.g., SPI interface) to the above-mentioned interface bus.

The memory, the memory controlling method, and the system according to the present disclosure have been described in detail above with reference to the accompanying drawings.

The present disclosure sets different modes for memory circuits (especially flash memory chips) from the perspective of reducing power consumption, divides energy-saving state, and can transform between the power-down state and the deep power-down state at will. Compared with the prior art, a flash memory in the deep power-down state can exit to the power-down state if only some read commands need to be executed. The power consumption of this state is still lower than that of the standby state, and some read operation can be implemented without enabling all circuits. After operation, it is possible to decide whether to return to the deep power-down state or the standby state as needed, providing greater flexibility of use. Further, the user can adjust the power mode of the device according to the usage requirements of the flash memory, which greatly reduces the power consumption and increases the battery usage time while satisfying the function.

The memory of the present disclosure can provide the deep power-down state that disables the decoder, and the memory in the deep power-down state can be exited to a power-down state, thereby enabling some functionality without enabling all components, further reducing functionality consumption.

The flowchart and block diagrams in the figures illustrate the architecture, functionality, and operation of possible implementations of systems and methods in accordance with various embodiments of the present disclosure. In this regard, each block in the flowchart or block diagrams may represent a module, segment, or portion of code that contains one or more functions for implementing the specified logical function(s) executable instructions. It should also be noted that, in some alternative implementations, the functions noted in the block may occur out of the order noted in the figures. For example, two blocks in succession may, in fact, be executed substantially concurrently, or the blocks may sometimes be executed in the reverse order, depending upon the functionality involved. It is also noted that each block of the block diagrams and/or flowchart illustrations, and combinations of blocks in the block diagrams and/or flowchart illustrations, can be implemented in dedicated hardware-based systems that perform the specified functions or operations, or can be implemented in a combination of dedicated hardware and computer instructions.

Various embodiments of the present disclosure have been described above, and the foregoing descriptions are exemplary, not exhaustive, and not limiting of the disclosed embodiments. Numerous modifications and variations will be apparent to those of ordinary skill in the art without departing from the scope and spirit of the described embodiments. The terminology used herein was chosen to best explain the principles of the embodiments, the practical application or improvement over the technology in the marketplace, or to enable others of ordinary skill in the art to understand the embodiments disclosed herein.

What is claimed is:

1. Memory comprising:
   a memory cell array;
   an instruction decoder;
   a controller; and
   an input and output interface including a chip select pin;
   wherein, the operational states of the memory include a deep power-down state, and in deep power-down state, the memory cell array, the instruction decoder and the controller are disabled;
   in response to the chip select pin receiving a chip select signal, the memory enters a higher power state in which the instruction decoder is enabled from the deep power-down state; and
   in response to the instruction decoder receiving a deep power-down state instruction, the memory enters the deep power-down state from the higher power state,
   wherein the input and output interface further comprises a clock interface, a data input interface, and a data output interface, and the memory further comprises a clock buffer, a data input buffer, a data output buffer, and a chip select signal buffer,
   in the deep power-down state, the clock buffer, the data input buffer, and the data output buffer are disabled.

2. The memory of claim 1, wherein
   in the deep power-down state, the chip select signal buffer is enabled.

3. The memory of claim 1 wherein, in the higher power state, the clock buffer, the data input buffer, the data output buffer, and the chip select signal buffer are all enabled.

4. The memory of claim 1, the operational states of the memory include a standby state and a power-down state as the higher power state, and in standby state, the memory cell array, the instruction decoder and the controller are enabled.

5. The memory of claim 4, wherein the memory in the power-down state enters the standby state in response to a reset instruction.

6. The memory of claim 5, wherein when executing READ ID instruction in the power-down state,
   in case that the reset instruction is received, the memory waits for the execution of the READ ID instruction to complete before executing the instruction to leave the power-down state.

7. The memory of claim 4, wherein the memory in the power-down state enters the standby state in response to an instruction to leave the power-down state,
   and when executing READ ID instruction in the power-down state,
   in case that the instruction to leave the power-down state is received, the memory enters the standby state without waiting for the execution of the READ ID instruction to complete.

8. The memory of claim 4, further comprising an ID register, wherein the ID register is enabled in the standby state, the power-down state and the deep power-down state.

9. The memory of claim 8, wherein, in the power-down state, the memory sends information in the ID register to a host in response to a READ ID instruction from the host.

10. The memory of claim 9, wherein, in the power-down state, internal clock is disabled, and the execution of the READ ID instruction is under the control of external clock CLK received from the input and output interface.

11. A memory controlling method, the memory includes a memory cell array, an instruction decoder, a controller and an input and output interface including a chip selection pin, the operational states of the memory include a deep power-down state, the method comprising:
    in response to the chip select pin receiving a chip select signal, the memory entering a higher power state from a deep power-down state;
    in response to the instruction decoder receiving a deep power-down state instruction, the memory entering the deep power-down state from the higher power state,
    wherein, in the deep power-down state, the memory cell array, the instruction decoder and controller are disabled; in the higher power state, the instruction decoder is enabled,
    wherein, the input and output interface further comprises a clock interface, a data input interface, and a data output interface, and the memory further comprises a clock buffer, a data input buffer, a data output buffer, and a chip select signal buffer,
    in the deep power-down state, the clock buffer, the data input buffer, and the data output buffer are disabled.

12. A system comprising:
    a host;
    an interface bus;
    a memory coupled to the host by connecting an input and output interface to the interface bus, wherein the memory comprises:
    a memory cell array;

an instruction decoder;
a controller; and
the input and output interface including a chip select pin;
wherein, the operational states of the memory include a deep power-down state, and in deep power-down state, the memory cell array, the instruction decoder and the controller are disabled;
in response to the chip select pin receiving a chip select signal, the memory enters the higher power state in which the instruction decoder is enabled from the deep power-down state; and
in response to the instruction decoder receiving a deep power-down state instruction, the memory enters the deep power-down state from the higher power state,
wherein the input and output interface further comprises a clock interface, a data input interface, and a data output interface, and the memory further comprises a clock buffer, a data input buffer, a data output buffer, and a chip select signal buffer, and in the deep power-down state, the clock buffer, the data input buffer, and the data output buffer are disabled.

13. The system of claim 12, wherein, in the higher power state, the clock buffer, the data input buffer, the data output buffer, and the chip select signal buffer are all enabled.

14. The system of claim 12, wherein
in the deep power-down state, the chip select signal buffer is enabled.

15. The system of claim 14, wherein the operational states of the memory include a standby state and a power-down state as the higher power state, and in standby state, the memory cell array, the instruction decoder and the controller are enabled.

16. The system of claim 15, wherein the memory in the power-down state enters the standby state in response to a reset instruction or an instruction to leave the power-down state.

17. The system of claim 16, wherein when executing READ ID instruction in the power-down state,
in case that the reset instruction is received, the memory waits for the execution of the READ ID instruction to complete before executing the instruction to leave the power-down state; and
in case that the instruction to leave the power-down state is received, the memory enters the standby state without waiting for the execution of the READ ID instruction to complete.

18. The system of claim 15, wherein the memory further comprises an ID register, wherein the ID register is enabled in the standby state, the power-down state and the deep power-down state.

19. The system of claim 18, wherein in the power-down state, the memory sends information in the ID register to the host in response to a READ ID instruction from the host.

20. The system of claim 19, wherein, in the power-down state, internal clock is disabled, and the execution of the READ ID instruction is under the control of external clock CLK received from the input and output interface.

* * * * *